Patented Apr. 19, 1932                                                                                    1,854,601

UNITED STATES PATENT OFFICE

BENJAMIN DAWSON PORRITT AND THOMAS RAYNER DAWSON, OF CROYDON, ENGLAND, ASSIGNORS TO THE RESEARCH ASSOCIATION OF BRITISH RUBBER MANUFACTURERS, OF CROYDON, ENGLAND

PRESERVATIVE COATINGS FOR GOODS OF RUBBER OR LIKE SUBSTANCES

No Drawing. Application filed July 21, 1928, Serial No. 294,572, and in Great Britain September 29, 1927.

It is well known that goods of rubber or like substances on exposure to weather and light deteriorate and gradually lose their characteristic elasticity and strength by reason of the oxidation of the rubber or like substance which oxidation is promoted and intensified by the actinic light.

This invention relates to the preservation of goods of rubber or like substances by the application thereto of paints or protective coatings the purpose of which is to protect the goods from the action of the oxygen of the air and the action of light in promoting oxidation and other deleterious effects.

Previous inventions have taken notice of one or other of these actions and preservative coatings have been proposed which contain ingredients whose purpose is to prevent the action of oxygen on rubber and like goods, while others contain ingredients whose purpose is to prevent the action of light.

The present invention consists in the application to rubber and like goods of penetrative and preservative paints or coatings comprising combinations of substances which protect the goods against the effects of both oxidation and actinic lights.

The coatings which according to the present invention are adapted to check or inhibit deterioration of rubber and like goods are formed with a medium consisting of a solvent or fluid capable of swelling and penetrating rubber to facilitate the entry of the other ingredients of the paint into the outer layers of the treated goods, together with a material such as bituminous substance, for example, mineral rubber, adapted to increase the viscosity and thickness of the coating and aid in the mechanical prevention of attack by oxygen.

Further to these ingredients are added (1) small amounts of substances such as the classes of anti-oxidants, including mono-, di-, and poly-hydric phenolic compounds, amino-hydroxy compounds, phenol-aldehyde condensation products, and like substances which inhibit or delay oxidation; and (2) small amounts of substances such as yellow or red dyestuffs, or derivatives of coumarin, which absorb light rays, and protect the goods against ultra-violet and other actinic rays.

By the combination of small proportions of one or more members of each of these classes of substance in fluid mediums of the kind stated, paints and coatings are obtained which give good protection against deterioration to rubber and like goods.

The following example is characteristic of and will illustrate the application of the invention.

60 parts by weight of a soft mineral rubber, 10 parts of an anti-oxidant (as, for example aldol α-naphthylamine), and 2 parts of oil red S are dissolved in 100 parts of toluene, and form a suitable paint for the preservation of rubber tyres and other goods of rubber and like materials.

Instead of embodying in the coating oil red S a small quantity of one of the analogous dyes, for example Sudan III, could be used.

It will be understood that the example given is not to be considered in any sense as restricting the invention, as variations in the proportions given and the combinations of agents used, may be found desirable in practice, and may be effected without departure from the invention; moreover, as will also be understood, the preservative paints or coatings according to the invention may if desired have embodied therein any suitable materials of known character calculated to improve the elasticity, adhesiveness, tenacity or other mechanical characteristics of the same, and thereby augment their protective action, for example a small proportion of rubber in the composition of the paint or coating would possibly improve its elastic and adhesive qualities.

As will be readily appreciated, preservative coatings and paints containing combinations of preservatives as hereinbefore described can be used with advantage in the manufacture, storage and employment of rubber and like goods.

What we claim is:

1. A penetrative and preservative coating or paint for rubber and like goods comprising 60 parts by weight of a soft mineral rubber, 10 parts of an anti-oxidant, and 2 parts of oil red S dissolved in 100 parts of toluene.

2. A penetrative and preservative coating or paint for rubber and like goods comprising 60 parts by weight of a soft mineral rubber, 10 parts of aldol α-naphthylamine, and 2 parts of oil red S dissolved in 100 parts of toluene.

3. A preservative coating or paint for rubber and like goods comprising 60 parts by weight of a soft mineral rubber, 10 parts of an anti-oxidant, and a small quantity of dyestuff which is an absorbent of actinic light, dissolved in toluene.

4. A preservative coating or paint for rubber and like goods comprising 60 parts by weight of a soft mineral rubber, 10 parts of aldol α-naphthylamine, and a small quantity of dyestuff which is an absorbent of actinic light, dissolved in toluene.

5. A perservative coating or paint for rubber and like goods comprising 60 parts by weight of a soft mineral rubber, 10 parts of an anti-oxidant, and a small quantity of dyestuff which is an absorbent of actinic light, dissolved in 100 parts of toluene.

6. A preservative coating or paint for rubber and like goods comprising 60 parts by weight of a soft mineral rubber, 10 parts of aldol α-naphthylamine, and a small quantity of dyestuff which is an absorbent of actinic light, dissolved in 100 parts of toluene.

In testimony whereof we affix our signatures.

BENJAMIN DAWSON PORRITT.
THOMAS RAYNER DAWSON.